(12) United States Patent
Basilio et al.

(10) Patent No.: US 6,200,377 B1
(45) Date of Patent: Mar. 13, 2001

(54) PROCESS FOR BENEFICIATION OF MIXTURES OF MINERAL PARTICLES

(75) Inventors: Cesar I. Basilio, Milledgeville; J. Michael Randolph, Augusta, both of GA (US)

(73) Assignee: Thiele Kaolin Company, Sandersville, GA (US)

(*) Notice: Subject to any disclaimer, the term of this patent is extended or adjusted under 35 U.S.C. 154(b) by 0 days.

(21) Appl. No.: 09/293,298

(22) Filed: Apr. 16, 1999

(51) Int. Cl.[7] .............................. C09C 1/00; C09C 1/42; B03B 1/00
(52) U.S. Cl. ...................... 106/486; 106/436; 106/447; 106/487; 501/148; 423/21.1; 423/23; 423/26; 423/49; 423/62; 423/69; 423/89; 423/153; 423/138; 209/3; 209/5; 209/166; 210/723; 252/61
(58) Field of Search .................. 252/60, 61; 210/723; 209/5, 3, 166, 167; 501/145, 148; 106/416, 436, 447, 456, 460, 461, 471, 480, 486, 487; 423/21.1, 23, 26, 49, 62, 69, 138, 155, 263, 89

(56) References Cited

U.S. PATENT DOCUMENTS

| | | |
|---|---|---|
| 2,660,303 | 11/1953 | Haseman . |
| 2,990,958 | 7/1961 | Greene et al. . |
| 3,371,988 | 3/1968 | Maynard et al. . |
| 3,438,494 | 4/1969 | Fuerstenau et al. . |
| 3,450,257 | 6/1969 | Cundy . |
| 3,701,417 | 10/1972 | Mercade . |
| 3,837,482 | 9/1974 | Sheridan, III . |
| 3,862,027 | 1/1975 | Mercade . |
| 3,979,282 | 9/1976 | Cundy . |
| 3,994,818 * | 11/1976 | Van Der Loo et al. .............. 252/171 |
| 4,472,271 | 9/1984 | Bacon, Jr. . |
| 4,492,628 | 1/1985 | Young et al. . |
| 4,604,369 | 8/1986 | Shi . |
| 4,629,556 | 12/1986 | Yoon et al. . |
| 4,871,466 | 10/1989 | Wang et al. . |
| 4,929,343 | 5/1990 | Wang et al. . |
| 5,522,986 | 6/1996 | Shi et al. . |
| 5,535,890 | 7/1996 | Behl et al. . |
| 5,685,899 | 11/1997 | Norris et al. . |
| 5,810,998 | 9/1998 | Arrington-Webb et al. . |
| 5,900,094 * | 5/1999 | Santini et al. ....................... 156/230 |

OTHER PUBLICATIONS

Book entitled "Reagents In Mineral Technology"; Edited by Somasundaran and Moudgil; Marcel Dekker, Inc.; 1988; Chapter 9 by Nagaraj; pp. 289–295 (no month).

Pending U.S. Patent Application Serial No. 09/045,842; Filed Mar. 20, 1998; Shi et al.

* cited by examiner

Primary Examiner—Michael Marcheschi
(74) Attorney, Agent, or Firm—Kennedy, Davis & Hodge, LLP

(57) ABSTRACT

An improved process for the beneficiation of mixtures of mineral particles (such as kaolin clays) containing minerals which chelate with hydroxamates. The use of a silicon-containing compound in combination with a hydroxamate results in a more effective separation of minerals which chelate with the hydroxamate.

38 Claims, No Drawings

PROCESS FOR BENEFICIATION OF MIXTURES OF MINERAL PARTICLES

TECHNICAL FIELD

This invention relates to an improved process for the beneficiation of a mixture of mineral particles which chelate with hydroxamates. In a more specific aspect, this invention relates to the use of a silicon-containing compound in this type of beneficiation process. This invention also relates to the beneficiated products which are produced by this invention.

Examples of minerals which chelate with hydroxamates are minerals which contain titanium, iron, copper, manganese, calcium or tin. This invention is especially useful in removing discoloring impurities (mainly titanium- and iron-containing minerals) from kaolin clays.

The present invention has an advantage over other beneficiation processes which use hydroxamates because the addition of a silicon-containing compound serves to increase the interaction of the hydroxamates with the chelatable minerals, which results in a more efficient beneficiation.

For ease of reference, this invention will be described with regard to kaolin clay. However, this invention will be understood as applicable for beneficiating other mixtures of mineral particles, such as iron ore and copper ore.

BACKGROUND OF THE INVENTION

Kaolin is a naturally occurring, relatively fine, white clay which may be generally described as a hydrated aluminum silicate. Kaolin clay, after purification and beneficiation, is widely used as a filler and pigment in various materials, such as rubber and resins, and in various coatings, such as paints and coatings for paper.

However, kaolin clay naturally contains discoloring impurities, such as oxides of titanium and iron. These oxides are largely responsible for the poor whiteness, brightness and color of the clay and are often the cause for rejecting a clay for commercial use. The use of kaolin as a coating pigment in the paper industry requires high brightness, proper color and gloss, which requires the removal of these discoloring impurities.

In general, wet beneficiation or purification of the kaolin to remove titanium and iron impurities involves high intensity magnetic separation, froth flotation, selective flocculation and/or leaching. The kaolin is initially dispersed in water, degritted (defined as removal of particles coarser than 44 microns) and then beneficiated in slurry form.

High intensity magnetic separation involves the use of a magnetic field to remove the impurities with magnetic susceptibility, such as anatase, rutile, hematite, mica and pyrite. However, this method is not very effective for submicron particles and thus the capability of this method to produce high brightness kaolin products is limited.

Froth flotation is an efficient method of removing titaniferous discoloring impurities from kaolin clays. In froth flotation, the impurity is rendered selectively hydrophobic by the addition of a collector (e.g., fatty acid, tall oil, hydroxamate, mixtures thereof, etc.). In some froth flotation processes, such as when tall oil is the collector, additional conditioning of the impurity with monovalent, divalent or trivalent cations may be necessary. The hydrophobic particles attach to the air bubbles and are separated from the hydrophilic kaolin in a froth flotation cell or column. Details of the flotation process to remove discoloring impurities from kaolin are described in U.S. Pat. Nos. 3,450,257; 3,979,282; 4,472,271; 4,492,628; 4,629,556; 5,522,986; 5,685,899 and 5,810,998.

A variation of froth flotation involves the use of carrier particles to improve fine particle flotation, as described in U.S. Pat. No. 2,990,958. However, due to the very fine particle size of kaolin clays, especially the fine-grained Tertiary kaolins, flotation is complicated and can be inefficient and/or costly.

The use of alkyl, aryl or alkylaryl hydroxamates in the flotation of minerals which chelate with hydroxamates is known in the industry (Nagaraj, *Reagents in Minerals Technology*, Chapter 9, pages 289–295, Marcel Dekker Inc., 1988). Hydroxamates are powerful collectors in flotation due to their ability to selectively chelate with minerals which contain titanium, yttrium, lanthanum, cerium, niobium, tantalum, calcium, tin, iron, manganese or copper. Mixtures of minerals containing copper and iron have been successfully beneficiated by flotation using hydroxamates as the collector (U.S. Pat. No. 3,438,494).

Flocculation involves the aggregation of fine particles which are suspended (i.e., dispersed) in liquid by a bonding agent (i.e., flocculent) that attaches to the particles. In general, the flocculant is initially adsorbed on the particles and bonds with adjoining particles. The bonded particles then form larger aggregates or flocs which settle or sediment out of the suspending liquid. Flocculants can be natural products such as starch, guar gum and alginates or synthetic polymers such as polyacrylamides, polyacrylates and polyethylene oxides. To achieve selectivity, the flocculant should only adsorb on certain types of mineral particles.

Selective flocculation is an effective process for recovering fine to ultrafine minerals that respond poorly to conventional beneficiation processes such as flotation and magnetic separation. The successful use of selective flocculation on mixtures of fine mineral particles such as kaolin clays, iron-bearing minerals, phosphates, potash, copper ores and coal is known in the industry.

Selective flocculation has been successful in beneficiating fine-grained kaolins. This process involves the activation of the impurity with polyvalent cations (U.S. Pat. Nos. 3,371,988; 3,701,417; 3,837,482 and 3,862,027), conditioning with ammonium salt (U.S. Pat. No. 4,604,369) or fatty acid and polyvalent cations (U.S. Pat. No. 5,535,890) and then selectively flocculating the impurities with anionic polymers. The drawback is the relatively low recoveries obtained in this process.

Selective flocculation is also being used to beneficiate other mixtures of mineral particles. Iron-bearing ores, specifically taconite, are commercially processed using selective flocculation. The iron ore is ground and then dispersed with caustic and sodium silicate. The dispersed ground ore is then selectively flocculated with a corn starch flocculant to separate hematite, an iron oxide mineral.

Phosphate minerals are beneficiated using selective flocculation to separate them from the associated clays, as described in U.S. Pat. No. 2,660,303. Potash is also beneficiated by selective flocculation using a nonionic polyacrylamide flocculant and/or ethoxylated alkylamic alkylguanidine complex. Another selective flocculation process to beneficiate alkaline carbonate minerals, phosphate minerals, zeolites and bauxites is described by U.S. Pat. No. 5,535,890. In this process, fatty acids and polyvalent cations are used to recondition the mineral suspension.

A recent development in selective flocculation is the use of hydroxamates for the beneficiation of mixtures of minerals which contain minerals which chelate with hydroxamates (U.S. patent application Ser. No. 09/045,842, filed Mar. 20, 1998 U.S. Pat. No. 6,041,939). The increased selectivity of hydroxamates for certain mineral phases in kaolin clays and other mixtures of mineral particles improves the process over selective flocculation processes utilizing other activators.

Another process involves leaching of the kaolin clay with iron-reducing reagents such as zinc or sodium hydrosulfite. This leaching method is limited to removing iron contaminants only. Other known leaching reagents and/or processes are not currently economical for removing titanium impurities.

Due to the limitations of these various beneficiation processes to separate certain minerals from mixtures of minerals, such as the discoloring impurities in kaolin clays, there is a need in the industry for a process that is more efficient and more cost effective.

SUMMARY OF THE INVENTION

Briefly described, the present invention provides an improved process for the removal, by flotation and/or selective flocculation, of certain chelatable minerals from mixtures of mineral particles (such as kaolin clays) using a combination of a hydroxamate and a silicon-containing compound as conditioners.

The present invention provides an improved process for the flotation and/or selective flocculation of chelatable (with hydroxamates) minerals such as those containing titanium, copper, iron, tin, manganese, yttrium, cerium, lanthanum, niobium, calcium or tantalum. The process of the present invention utilizes the increased interaction of the combination of hydroxamates and silicon-containing compounds for these chelatable minerals which, in turn, increases the efficiency of the flotation and selective flocculation processes over other methods, such as those methods utilizing fatty acids and/or hydroxamates as flotation collectors and various cations or hydroxamates as activators in selective flocculation.

The improved beneficiation process of this invention is especially useful in the production of high brightness kaolin products and/or titanium rich kaolin products to be used in paper or paint filler and coating applications. This process is also useful in the beneficiation of ores that contain iron, manganese, copper or tin.

The present invention differs from the above-described prior flotation and selective flocculation processes which use hydroxamates. In the present invention, the mineral particles are conditioned with the combination of hydroxamates and silicon-containing compounds which enhances the selectivity of the beneficiation process. The hydroxamates interact with the chelatable minerals and make the surface of these chelatable minerals hydrophobic. The addition of this silicon-containing compound increases the hydrophobicity of these minerals, resulting in improved attachment to the air bubbles in flotation.

In selective flocculation, the interaction of these chelatable minerals with the flocculant increases with the presence of both hydroxamates and silicon-containing compounds. Since the interaction of the flocculant and the hydroxamate-chelated minerals is based on hydrogen—hydrogen and hydrophobic bonding, the increased hydrophobicity of these minerals with the adsorption of the silicon-containing compounds will improve the flocculant-mineral bonding. These interactions in flotation and selective flocculation are stronger and more selective than the interactions with hydroxamates alone.

Accordingly, an object of this invention is to provide a beneficiation process for treating mixtures of mineral particles.

Another object of this invention is to provide an improved beneficiation process for removing impurities from mixtures of mineral particles.

Another object of this invention is to provide a beneficiation process to improve the grade of mixtures of mineral particles.

Another object of this invention is to provide a beneficiation process which uses a combination of hydroxamates and silicon-containing compounds in the flotation of mixtures of mineral particles.

Another object of this invention is to provide a beneficiation process which uses a combination of hydroxamates and silicon-containing compounds in the selective flocculation of mixtures of mineral particles.

Another object of this invention is to provide a beneficiation process that uses a combination of hydroxamates and silicon-containing compounds in the flotation of kaolin clays.

Another object of this invention is to provide a beneficiation process that uses a combination of hydroxamates and silicon-containing compounds in the selective flocculation of kaolin clays.

Another object of this invention is to provide a beneficiation process that uses a combination of hydroxamates and silicon-containing compounds in the flotation of minerals which chelate with such hydroxamates.

Another object is to provide a beneficiation process which uses a combination of hydroxamates and silicon-containing compounds in the selective flocculation of minerals which chelate with such hydroxamates.

Another object of this invention is to provide a process for the beneficiation of kaolin clays.

Still another object of this invention is to provide a beneficiation process for the removal of discoloring impurities from kaolin clays.

Still another object of this invention is to provide a kaolin clay product having improved brightness over the kaolin clay starting material.

Still another object of this invention is to provide a process for the flotation and selective flocculation of kaolin clays to produce a kaolin clay product having improved brightness over the kaolin clay starting material.

Still another object of this invention is to provide a titanium rich kaolin clay product.

These and other objects, features and advantages of this invention will become apparent from the following detailed description.

DETAILED DESCRIPTION OF THE INVENTION

The present invention relates to a process for beneficiating a mixture of mineral particles containing minerals which chelate with hydroxamates. The mixture of mineral particles is first dispersed into a slurry form and then mixed with a hydroxamate to condition the mineral particles. During mixing, the chelatable minerals are chelated with the hydroxamate. A silicon-containing compound is then added and mixed with the conditioned mineral particles. For ease of conditioning, the silicon-containing compound may also be added with the hydroxamate and conditioned with the mixture of mineral particles at the same time.

In the case of flotation, the chelated minerals are then transferred to a flotation cell and floated. For selective flocculation, a flocculant is mixed with the mineral suspension, which results in the chelated minerals being selectively flocculated, after which the flocculated minerals are separated from the slurry. Separation of the minerals after selective flocculation can be achieved by a variety of processes such as sedimentation, centrifugation, magnetic separation, dissolved air flotation or a combination of such processes.

From the beneficiation process of this invention, the product can be defined as having improved brightness (as would occur, for example, if the starting mixture of mineral particles is a kaolin clay) or as having improved grade.

In this application, the term "grade" refers either to the content of the marketable or valuable end product in the material to be concentrated or to the impurity to be removed. In metallic ores, the percent metal (e.g., % Cu, % Fe, etc.) is often used as a measure of grade, while for some metals sold in oxide form, the grade is quoted in terms of the marketable oxide content (e.g. % $TiO_2$, % $Fe_2O_3$, etc.). The mineral content (e.g., % $CaCO_3$, % $CaF_2$, etc.) is used to quantify the grade of non-metallic ores. On the other hand, the amount of discoloring impurites present (e.g., % $TiO_2$, % $Fe_2O_3$, etc.) is used as a measure of grade in kaolin clays.

In the beneficiation of kaolin clays, the starting kaolin clay material is dispersed by blunging the clay with water in the presence of a dispersing agent (1–25 pounds of dispersing agent per ton of dry solids). Effective dispersants include sodium silicate, sodium metasilicate, sodium hexametaphosphate, tetrasodium pyrophosphate and polyacrylates (such as sodium polyacrylate and lithium polyacrylate). A preferred dispersant is sodium silicate using dosages ranging from 2–10 lb/ton. An appropriate pH modifier may be added, such as sodium hydroxide, sodium carbonate or ammonium hydroxide, to obtain a pH in the range of 5–11, preferably 8–10. Blunging is conducted at a relatively high pulp density, in the range of 35–70% solids by weight, preferably 50–60%, using a high speed, high energy dispersion device. A low speed, low energy dispersion device can also be used.

Following dispersion, the kaolin is conditioned by mixing the dispersed slurry with the hydroxamate which permits interaction between the hydroxamate and the discoloring impurities of the kaolin. The amount of hydroxamate added to the kaolin slurry depends on several factors, such as the amount of impurities present in the kaolin, the nature of the kaolin to be processed and the amount of kaolin feed material (i.e., the kaolin clay starting material). The amount of hydroxamate added must be sufficient to promote separation of the impurities. Hydroxamate additions in the range of 0.2–10 pounds per ton of dry clay, preferably 0.5–5 pounds per ton of dry clay, are effective. A blend of hydroxamate and fatty acid compound, as described in U.S. Pat. No. 5,522,986, may be used as the conditioning agent.

After conditioning with the hydroxamate, the silicon-containing compound is added to and mixed with the slurry, which allows the silicon-containing compound to interact with the hydroxamate adsorbed onto the discoloring impurities. As in the case of the hydroxamate addition, the amount of silicon-containing compound added to the dispersed kaolin depends on several factors, such as the amount of impurities present in the kaolin, the nature of the kaolin feed material and the amount of kaolin to be processed. The amount of silicon-containing compound added for effective separation of the impurities ranges from 0.01–5 pounds per dry ton, preferably 0.05–2 pounds per dry ton. For ease of conditioning, the silicon-containing compound may be added together with the hydroxamate and mixed at the same time.

In the case of flotation, the conditioned kaolin slurry is then transferred to the froth flotation cell, and if necessary, diluted to a pulp density preferably within the range of about 15–45% solids by weight. A frother, which is generally a heteropolar surface active organic reagent, may be added to stabilize the air bubbles. The amount of frother added depends on several factors, such as the type of frother used and the amount of the kaolin feed material. The frothers that can be used include alcohol, amine, alkoxy and polyglycol compounds. The preferred frothers include methyl isobutyl carbinol, ethyl hexanol, pine oil and polypropylene glycol. The frother dosage for effective flotation ranges from 0.01–2 pounds per ton, preferably 0.05–1 pound per ton.

The operation of the froth flotation machine is conducted in conventional fashion. After an appropriate period of operation, during which the discoloring impurities are removed with the froth phase, the kaolin slurry left in the flotation cell can be subjected to magnetic separation and/or leaching, and then filtered and dried in conventional fashion.

The froth flotation process can be conducted either in a mechanical or pneumatic machine. A typical pneumatic machine is the flotation column, while a typical mechanical machine is an impeller driven flotation device such as the DENVER subaeration and D-R flotation machines.

In the case of selective flocculation, the kaolin slurry conditioned with the combination of hydroxamate and silicon-containing compound is diluted to a range of 5–40% solids, preferably 20–30% solids. An anionic polymer is then added to promote flocculation of the chelatable discoloring impurities. While the type of flocculant is not critical, high molecular weight anionic polymers (e.g., acrylamide/acrylate copolymers) such as those polymers available commercially under the trademarks SHARPFLOC 9130H and 9230H (from Sharpe Specialty Chemicals Co., Macon, Ga.) and NALCO 9601 (from Nalco Chemical Co., Naperville, Ill.) are preferred. The flocculated phase is then separated from the slurry, while the kaolin left in suspension is recovered and further processed. Further processing may include magnetic separation, leaching, classification, screening, filtration, drying or a combination of such processes.

The hydroxamate activators used in this invention are hydroxamates, or a mixture of such compounds, having the general formula:

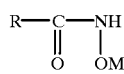

in which R is an akyl, aryl or alkylaryl group having 4–28 carbon atoms, and M is hydrogen, an alkali metal or alkaline earth metal.

Examples of suitable R groups include butyl, hexyl, octyl, dodecyl, lauryl, 2-ethylhexyl, oleyl, eicosyl, phenyl, totyl, naphthyl and hexylphenyl.

Examples of suitable alkali metals are lithium, sodium and potassium.

Examples of suitable alkaline earth metals are magnesium, calcium and barium.

Examples of the hydroxamates which are useful in the present invention include potassium butyl hydroxamate, potassium octyl hydroxamate, potassium lauryl hydroxamate, potassium 2-ethylhexyl hydroxamate, potassium oleyl hydroxamate, potassium phenyl hydroxamate, potassium naphthyl hydroxamate, potassium hexylphenyl hydroxamate, and the corresponding salts of sodium and other alkali or alkaline earth metals of such hydroxamate compounds. The salts can be converted to the corresponding acids by those skilled in the art. These hydroxamate compounds can be prepared by methods such as described in U.S. Pat. Nos. 4,629,556; 4,871,466; and 4,929,343.

An especially preferred hydroxamate compound is available commercially from Cytec Industries, Inc., West Paterson, N.J., under the trademark CYTEC S-6493 MINING REAGENT. This compound is a mixture of alkyl hydroxamic acids.

During conditioning, the chelatable mineral particles are chelated (i.e., complexed) with the hydroxamate.

If used in combination with the hydroxamate activator, the fatty acid compound (or mixture of such compounds) has the general formula:

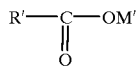

in which R' is an alkyl, aryl or alkylaryl group having 1–26 carbon atoms, and M' is hydrogen, an alkali metal or an alkaline earth metal.

Examples of suitable R' groups include methyl, ethyl, butyl, octyl, lauryl, 2-ethylhexyl, oleyl, eicosyl, phenyl, naphthyl and hexylphenyl.

Examples of suitable alkali metals are lithium, sodium and potassium.

Examples of suitable alkaline earth metals are magnesium, calcium and barium.

These fatty acid compounds are commercially available, such as from Westvaco Corporation, Chemical Division, Charleston Heights, S.C.

An especially preferred fatty acid compound is commercially available from Westvaco Corporation under the trademark WESTVACO L-5. This compound is a tall oil, which is a mixture of fatty acid compounds.

The silicon-containing compounds useful in this invention have the following general formula:

$$(R''_n\text{—Si—}O_{4-n})_m$$

in which R'' is vinyl, hydrogen or an alkyl, aryl or alkylaryl group having 1–26 carbon atoms, n is 0–3 and m is 1 or larger.

Examples of suitable R'' groups include methyl, ethyl, butyl, octyl, lauryl, 2-ethylhexyl, oleyl, eicosyl, phenyl, naphtyl, hexylphenyl, vinyl and hydrogen.

Examples of silicones which are useful in the process of this invention include polydimethylsiloxanes, polymethylhydrosiloxanes, polyethylhydrosiloxanes and polymethylalkylsiloxanes.

Examples of suitable siloxanes include hexamethyldisiloxane, hexamethyltrisiloxane, disiloxane, vinylheptamethyltrisiloxane, octamethyltrisiloxane, tetramethyldisiloxane and tetravinyldimethyldisiloxane.

The present invention is further illustrated by the following examples which are illustrative of certain embodiments designed to teach those of ordinary skill in this art how to practice this invention and to represent the best mode contemplated for carrying out this invention.

In the following examples, the efficiency of the various processes in removing titaniferrous impurities from kaolin clays is compared using an index known as the "separation efficiency" (S.E.), which is described in further detail by Wills (see *Mineral Processing Technology*, Fifth Edition, Pergamon Press, Tarrytown, N.Y., 1992, pages 33–35). The S.E. index takes into account the amount of impurities removed by the process and the amount of clay product recovered as a result of the process. The mathematical expression used to compute the separation efficiency is the following:

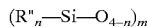

where $R_m$ is the percent recovery of the valuable material, and $R_g$ is the percent recovery of the gangue into the product.

The value of the S.E. index varies theoretically from zero for no separation to 100 for a perfect separation, as would occur if all of the kaolin is recovered with no impurities remaining in the kaolin product. In the case of kaolin beneficiation, the S.E. index typically ranges from 20 to 75%.

EXAMPLES 1–2

Two samples of coarse-grained kaolin clay from Washington County, Georgia containing about 1.4% $TiO_2$ are floated using the method described in U.S. Pat. No. 4,629,556 and the present invention.

For the method described in U.S. Pat. No. 4,629,556 (Example 1), 2000 dry grams of sample are blunged for 6 minutes at 6000 rpm using a high speed mixer. Blunging of the clay is conducted at 60% solids using 2.4 pounds sodium silicate per ton of dry clay and 1.6 pounds sodium hydroxide per ton of dry clay. After dispersing the clay, 0.75 pounds CYTEC S-6493 MINING REAGENT (alkyl hydroxamate) per ton of dry clay is added and the slurry is conditioned for 6 minutes at 6000 rpm in the same high speed mixer. The conditioned slurry is diluted to 25% solids using deionized water and then transferred to a DENVER D-12 flotation cell. A frother, methyl isobutyl carbinol (MIBC), is added at a dosage of 0.4 pound per ton of dry clay and the slurry is allowed to mix in the flotation cell for one minute. The slurry is then floated and a portion is taken for measurement of pulp density, from which the yield of treated kaolin clay is determined, and for x-ray fluorescence analysis to determine the residual $TiO_2$ content. This information (yield and residual $TiO_2$ content) is used to calculate the separation efficiency.

The second sample (Example 2) is processed using the present invention. A 2000 dry gram clay sample is blunged for 6 minutes at 6000 rpm in a high speed mixer. The sample is blunged at 60% solids using 3 pounds sodium silicate per ton of dry clay and 1.5 pounds sodium hydroxide per ton of dry clay. (Note that the present invention uses a larger amount of dispersant than in Example 1.) After dispersing the clay, 0.75 pounds CYTEC S-6493 MINING REAGENT (alkyl hydroxamate) per ton of dry clay and 0.1 pound polymethylhydrosiloxane (PMHS) per ton of dry clay is added and the slurry is conditioned for 6 minutes at 6000 rpm in the same high speed mixer. The conditioned clay slurry is then diluted to 25% solids using deionized water, transferred to a DENVER D-12 flotation cell and 0.4 pound MIBC per ton of dry clay is added before flotation. The clay slurry is then floated and a portion of the flotation product is taken for $TiO_2$ determination and pulp density measurement.

As shown by the results given in Table 1, the amount of $TiO_2$ remaining in the flotation product is lower and the clay recovery using the present invention (Example 2) is higher than in the method of Example 1. Correspondingly, the separation efficiency for the flotation process using the present invention is higher than in the method of Example 1. These results show the improved flotation performance obtained with the use of the silicon-containing compound in combination with hydroxamate.

TABLE 1

| | Reagent Dosage (lb/ton) | | Feed | Product | Clay % | Separation |
|---|---|---|---|---|---|---|
| | S-6493 | PMHS | % $TiO_2$ | % $TiO_2$ | Recovery | Efficiency |
| Example 1 | 0.75 | 0 | 1.41 | 0.97 | 82 | 25.6 |
| Example 2 | 0.75 | 0.1 | 1.41 | 0.83 | 91 | 37.6 |

EXAMPLES 3–4

Flotation tests are carried out using a fine-grained East Georgia kaolin sample using the process described in U.S. Pat. No. 4,629,556 and the present invention.

For the process using the procedure of U.S. Pat. No. 4,629,556 (Example 3), a 2000 dry gram sample is initially blunged for 6 minutes at 55% solids and 6000 rpm using a high speed mixer. In the blunging stage, 6.7 pounds sodium silicate per ton of dry clay and 2.4 pounds sodium hydroxide per ton of dry clay are added. After blunging, the dispersed clay is conditioned with 2 pounds CYTEC S-6493 MINING REAGENT (alkyl hydroxamate) per ton of dry clay for 12 minutes in the high speed mixer at 6000 rpm. The conditioned slurry is diluted to 25% solids, transferred to a DENVER D-12 flotation cell, 0.4 pound methyl isobutyl carbinol per ton of dry clay is added, and then the slurry is mixed for 1 minute. The slurry is floated and a portion of the flotation product is taken for $TiO_2$ determination and pulp density.

For the present invention (Example 4), a 2000 dry gram sample is blunged at 55% solids and 6000 rpm using a high speed mixer. The clay is dispersed using 8.1 pounds sodium silicate per ton of dry clay and 1.2 pounds sodium hydroxide per ton of dry clay. The dispersed slurry is then conditioned with 2 pounds CYTEC S-6493 MINING REAGENT per ton of dry clay and 0.1 pound polymethylhydrosiloxane per ton of dry clay for 12 minutes in the high speed mixer. The slurry is then diluted to 25% solids and floated in a DENVER D-12 flotation cell with 0.4 pound methyl isobutyl carbinol per ton of dry clay added as the frother. The flotation product $TiO_2$ grade and pulp density are then determined, and the separation efficiency for flotation is calculated.

As shown in Table 2, the use of the present invention results in a lower $TiO_2$ content in the product and a higher recovery of clay. This improvement in flotation performance is further indicated by the higher separation efficiency index for the present invention (Example 4). The use of a silicon-containing compound in combination with hydroxamate results in a more selective removal of the titaniferous impurities from the kaolin clay.

TABLE 2

| | Reagent Dosage (lb/ton) | | Feed | Product | Clay % | Separation |
|---|---|---|---|---|---|---|
| | S-6493 | PMHS | % $TiO_2$ | % $TiO_2$ | Recovery | Efficiency |
| Example 3 | 2 | 0 | 2.12 | 1.46 | 82.8 | 25.8 |
| Example 4 | 2 | 0.1 | 2.12 | 1.18 | 86.2 | 38.0 |

EXAMPLES 5–6

A test is conducted on an East Georgia kaolin using a modified selective flocculation process which uses alkyl hydroxamate, as described in U.S. patent application Ser. No. 09/045,842, filed Mar. 20, 1998 (now U.S. Pat. No. 6,041,939, issued Mar. 28, 2000), to condition the slurry prior to selective flocculation with an anionic polymeric flocculant. In this test (Example 5), 2000 dry grams of crude is dispersed in water to 55% solids with 6.7 pounds sodium silicate per ton of dry clay and 1.5 pounds sodium hydroxide per ton of dry clay using a high speed mixer for 6 minutes. After blunging, 2 pounds CYTEC S-6493 (alkyl hydroxamate) per ton of dry clay is added and the slurry is conditioned in a high speed mixer for 12 minutes. The conditioned slurry is then diluted to 20% solids and 0.045 pounds NALCO 9601 (anionic polymeric flocculant) per ton of dry clay is added. The slurry is then agitated lightly for 2 minutes and gravity settled for 5 minutes per inch depth of slurry. The clay product suspension is siphoned off after settling, coagulated with 12 pounds aluminum sulfate per ton of dry clay and sulfuric acid to pH 3.0, leached with 9 pounds sodium hydrosulfite per ton of dry clay, filtered and dried. The dried sample is pulverized and analyzed for brightness and $TiO_2$ content.

For the process of this invention (Example 6), a 2000 dry gram batch of East Georgia kaolin is blunged in water at 55% solids with 8.1 pounds sodium silicate per ton of dry clay and 1.2 pounds sodium hydroxide per ton of dry clay using a high speed mixer for 6 minutes. After blunging, 2 pounds CYTEC S-6493 (alkyl hydroxamate) per ton of dry clay and 0.2 pound polymethylhydrosiloxane per ton of dry clay are added and the slurry is mixed in the same high speed mixer for 12 minutes. Similar to the procedure for the control sample, the conditioned slurry is diluted to 20% solids, 0.045 pound NALCO 9601 (anionic polymeric flocculant) per ton of dry clay, are added and then agitated lightly for 2 minutes. The white clay product remaining in suspension is then processed as described for Example 5.

The results of the analyses of the different products are shown in Table 3. As shown, the use of hydroxamate in combination with polymethylhydrosiloxane results in significantly improved recovery with no significant change in the $TiO_2$ content of the product. The separation efficiency indices for each process show that the present invention provides better performance than the process described in U.S. patent application Ser. No. 09/045,842 (now U.S. Pat. No. 6,041,939, issued Mar. 28, 2000). Interestingly, the use of the present invention also results in producing a product with an improved brightness.

TABLE 3

| | Reagent Dosage (lb/ton) | | Feed | Product | Clay | Separation | Product GE |
|---|---|---|---|---|---|---|---|
| | S-6493 | PMHS | % TiO$_2$ | % TiO$_2$ | % Recovery | Efficiency | Brightness |
| Example 5 | 2 | 0 | 2.11 | 0.79 | 59.6 | 37.2 | 92 |
| Example 6 | 2 | 0.2 | 2.11 | 0.84 | 71.4 | 42.9 | 92.3 |

This invention has been described in detail with particular reference to certain embodiments, but variations and modifications can be made without departing from the spirit and scope of the invention as defined in the following to claims.

What is claimed is:

1. A beneficiation process which comprises the sequential steps of:
   A. producing an aqueous slurry of a mixture of mineral particles containing minerals which chelate with hydroxamates;
   B. conditioning the mineral particles by mixing the aqueous slurry with a hydroxamate which chelates with the minerals and which has the formula:

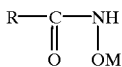

in which R is an alkyl, aryl or alkyaryl group having 4–28 carbon atoms, and M is hydrogen, an alkali metal or an alkaline earth metal, wherein the chelatable minerals are chelated;
   C. adding a silicon-containing compound to the aqueous slurry; and
   D. separating the chelated minerals from the aqueous slurry.

2. A beneficiation process as defined by claim 1 wherein the mixture of mineral particles is a kaolin clay.

3. A beneficiation process as defined by claim 1 wherein the mixture of mineral particles is an ore containing titanium, yttrium, cerium, lanthanum, niobium, calcium, tantalum, tin, iron, manganese or copper.

4. A beneficiation process as defined by claim 1 wherein the minerals which chelate with hydroxamates are minerals containing iron or titanium.

5. A beneficiation process as defined by claim 1 wherein the hydroxamate is an alkyl hydroxamate.

6. A beneficiation process as defined by claim 1 wherein R is butyl, hexyl, octyl, dodecyl, lauryl, 2-ethylhexyl, oleyl, eicosyl, phenyl, totyl, naphthyl or hexylphenyl.

7. A beneficiation process as defined by claim 1 wherein M is hydrogen, lithium, sodium, potassium, magnesium, calcium or barium.

8. A beneficiation process as defined by claim 1 wherein the hydroxamate is potassium butyl hydroxamate, potassium octyl hydroxamate, potassium lauryl hydroxamate, potassium 2-ethylhexyl hydroxamate, potassium oleyl hydroxamate, potassium dodecyl hydroxamate, potassium eicosyl hydroxamate, potassium phenyl hydroxamate, potassium naphthyl hydroxamate, potassium hexylphenyl hydroxamate or the corresponding sodium salts of such hydroxamates.

9. A beneficiation process as defined by claim 1 wherein the beneficiated product is a kaolin clay having improved brightness over the starting mixture of mineral particles.

10. A beneficiation process as defined by claim 1 wherein the beneficiated product has improved grade over the starting mixture of mineral particles.

11. A beneficiation process as defined by claim 1 wherein the beneficiated product is a titanium rich kaolin clay.

12. A beneficiation process as defined by claim 1 wherein a fatty acid compound is added during the conditioning step and wherein the fatty acid compound has the formula:

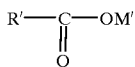

in which R' is an alkyl, aryl or alkylaryl group having 1–26 carbon atoms, and M is hydrogen, an alkali metal or an alkaline earth metal.

13. A beneficiation process as defined by claim 1 wherein the silicon-containing compound has the formula:

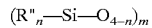

in which R" is vinyl, hydrogen or an alkyl, aryl or alkylaryl group having 1–26 carbon atoms, n is 0–3 and m is at least 1.

14. A beneficiation process as defined by claim 1 wherein the chelated minerals are separated from the aqueous slurry by selective flocculation.

15. A beneficiation process as defined by claim 1 wherein the chelated minerals are separated from the aqueous slurry by flotation.

16. A beneficiation process as defined by claim 13 wherein the silicon-containing compound is a silicone.

17. A beneficiation process as defined by claim 16 wherein the silicone is a polydimethylsiloxane, polymethylhydrosiloxane, polyethylhydrosiloxane, polymethylalkylsiloxane or a mixture thereof.

18. A beneficiation process as defined by claim 13 wherein the silicon-containing compound is a siloxane.

19. A beneficiation process as defined by claim 18 wherein the siloxane is hexamethyldisiloxane, hexamethyltrisiloxane, disiloxane, vinylheptamethyltrisiloxane, octamethyltrisiloxane, tetramethyldisiloxane, tetravinyldimethyldisiloxane or a mixture thereof.

20. A beneficiated product produced by a beneficiation process which comprises the sequential steps of:
   A. producing an aqueous slurry of a mixture of mineral particles containing minerals which chelate with hydroxamates;
   B. conditioning the mineral particles by mixing the aqueous slurry with a hydroxamate which chelates with the minerals and which has the formula:

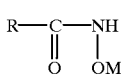

in which R is an alkyl, aryl or alkyaryl group having 4–28 carbon atoms, and M is hydrogen, an alkali metal or an alkaline earth metal, wherein the chelatable minerals are chelated;

C. adding a silicon-containing compound to the aqueous slurry; and

D. separating the chelated minerals from the aqueous slurry to produce a beneficiated product.

21. A beneficiated product as defined by claim 20 wherein the mixture of mineral particles is a kaolin clay.

22. A beneficiated product as defined by claim 20 wherein the mixture of mineral particles is an ore containing titanium, yttrium, cerium, lanthanum, niobium, calcium, tantalum, tin, iron, manganese or copper.

23. A beneficiated product as defined by claim 20 wherein the minerals which chelate with hydroxamates are minerals containing titanium or iron.

24. A beneficiated product as defined by claim 20 wherein the hydroxamate is an alkyl hydroxamate.

25. A beneficiated product as defined by claim 20 wherein R is butyl, hexyl, octyl, dodecyl, lauryl, 2-ethylhexyl, oleyl, eicosyl, phenyl, totyl, naphthyl or hexylphenyl.

26. A beneficiated product as defined by claim 20 wherein M is hydrogen, lithium, sodium, potassium, magnesium, calcium or barium.

27. A beneficiated product as defined by claim 20 wherein the hydroxamate is potassium butyl hydroxamate, potassium octyl hydroxamate, potassium lauryl hydroxamate, potassium 2-ethylhexyl hydroxamate, potassium oleyl hydroxamate, potassium dodecyl hydroxamate, potassium eicosyl hydroxamate, potassium phenyl hydroxamate, potassium naphthyl hydroxamate, potassium hexylphenyl hydroxamate or the corresponding sodium salts of such hydroxamates.

28. A beneficiated product as defined by claim 20 wherein the product is a kaolin clay having a brightness value which is improved over the brightness value of the starting mixture of mineral particles.

29. A beneficiated product as defined by claim 20 wherein the product has improved grade over the starting mixture of mineral particles.

30. A beneficiated product as defined by claim 20 wherein the product is a titanium rich kaolin clay.

31. A beneficiated product as defined by claim 20 wherein a fatty acid compound is added during the conditioning step and wherein the fatty acid compound has the formula:

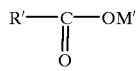

in which R' is an alkyl, aryl or alkylaryl group having 1–26 carbon atoms, and M is hydrogen, an alkali metal or an alkaline earth metal.

32. A beneficiated product as defined by claim 20 wherein the silicon-containing compound has the formula:

$$(R''_n\text{---}Si\text{---}O_{4-n})_m$$

in which R'' is vinyl, hydrogen or an alkyl, aryl or alkylaryl group having 1–26 carbon atoms, n is 0–3 and m is at least 1.

33. A beneficiated product as defined by claim 20 wherein the chelated minerals are separated from the aqueous slurry by selective flocculation.

34. A beneficiated product as defined by claim 20 wherein the chelated minerals are separated from the aqueous slurry by flotation.

35. A beneficiated product as defined by claim 20 wherein the silicon-containing compound is a silicone.

36. A beneficiated product as defined by claim 35 wherein the silicone is a polydimethylsiloxane, polymethylhydrosiloxane, polyethylhydrosiloxane, polymethylalkylsiloxane or mixture thereof.

37. A beneficiated product as defined by claim 20 wherein the silicon-containing compound is a siloxane.

38. A beneficiated product as defined by claim 37 wherein the siloxane is hexamethyldisiloxane, hexamethyltrisiloxane, disiloxane, vinylheptamethyltrisiloxane, octamethyltrisiloxane, tetramethyldisiloxane, tetravinyldimethyldisiloxane or a mixture thereof.

* * * * *